United States Patent
Grote et al.

(10) Patent No.: US 12,081,012 B2
(45) Date of Patent: Sep. 3, 2024

(54) DC VOLTAGE SWITCHING DEVICE HAVING EARTH FAULT PROTECTION

(71) Applicant: PHOENIX CONTACT GmbH & Co. KG, Blomberg (DE)

(72) Inventors: Tobias Grote, Luedge (DE); Lutz Heuer, Blomberg (DE); Detlev Schuergens, Blomberg (DE)

(73) Assignee: PHOENIX CONTACT GMBH & CO. KG (DE)

( * ) Notice: Subject to any disclaimer, the term of this patent is extended or adjusted under 35 U.S.C. 154(b) by 0 days.

(21) Appl. No.: 18/577,178

(22) PCT Filed: Jul. 3, 2022

(86) PCT No.: PCT/EP2022/068358
§ 371 (c)(1),
(2) Date: Jan. 5, 2024

(87) PCT Pub. No.: WO2023/280729
PCT Pub. Date: Jan. 12, 2023

(65) Prior Publication Data
US 2024/0266820 A1 Aug. 8, 2024

(30) Foreign Application Priority Data
Jul. 5, 2021 (BE) .................... 2021/5522

(51) Int. Cl.
*H02H 3/16* (2006.01)
*H02H 1/00* (2006.01)

(52) U.S. Cl.
CPC ............ *H02H 3/16* (2013.01); *H02H 1/0007* (2013.01)

(58) Field of Classification Search
CPC ............................... H02H 3/16; H02H 1/0007
See application file for complete search history.

(56) References Cited

U.S. PATENT DOCUMENTS

| 10,020,650 B2 * | 7/2018 | Roesner | H02J 7/00306 |
| 2004/0027734 A1 * | 2/2004 | Fairfax | H01H 9/542 |
| | | | 361/2 |

(Continued)

FOREIGN PATENT DOCUMENTS

| CN | 102460879 | 5/2012 |
| DE | 10 2019 203 977 B4 | 9/2020 |

(Continued)

OTHER PUBLICATIONS

International Search Report and Written Opinion mailed Oct. 24, 2022 issued in connection with corresponding international application No. PCT/EP2022/068358 with English translation (5 pages total).

(Continued)

*Primary Examiner* — Jared Fureman
*Assistant Examiner* — Nicolas Bellido
(74) *Attorney, Agent, or Firm* — John Maldjian, Esq.; Stevens & Lee PC

(57) ABSTRACT

A DC voltage switching device for coupling a DC voltage load via a positive and a negative conductor to a DC voltage source, wherein the positive and negative conductors are routed through the DC voltage switching device. The DC voltage switching device comprises
a first switching element for coupling and decoupling the DC voltage load, which is a semiconductor-based, electronically controllable switching element integrated in the positive or negative conductor;
a fuse integrated in the respective other conductor;
a sensor, at least for detecting the current flow of the conductor in which the first switching element is integrated: and
an evaluation device connected to the sensor and the first switching element, which is set up to compare the (Continued)

detected current flow with respect to a threshold value and to trigger the first switching element in order to disconnect the DC voltage load when the threshold value is passed.

15 Claims, 4 Drawing Sheets

(56) References Cited

U.S. PATENT DOCUMENTS

| | | |
|---|---|---|
| 2010/0290164 A1 | 11/2010 | Kinsel |
| 2016/0072269 A1* | 3/2016 | Esschendal ............ H02H 7/268 361/62 |
| 2019/0334340 A1* | 10/2019 | Niehoff ................. H02H 3/087 |
| 2021/0013709 A1* | 1/2021 | Kang .................... H03K 17/18 |
| 2022/0166206 A1 | 5/2022 | Beckert et al. |

FOREIGN PATENT DOCUMENTS

| | | | |
|---|---|---|---|
| EP | 3723223 A1 * | 10/2020 | |
| WO | WO-03103110 A1 * | 12/2003 | ............ H01H 9/542 |
| WO | 2018/172134 A1 | 9/2018 | |
| WO | 2020/193167 A1 | 10/2020 | |
| WO | 2020/193168 A1 | 10/2020 | |

OTHER PUBLICATIONS

International Preliminary Report on Patentability mailed May 16, 2023 issued in connection with corresponding international application No. PCT/EP2022/068358 with English translation (14 pages total).

Belgium Search Report and Written Opinion issued Feb. 24, 2022, in connection with BE application No. 202105522 with English language translation (16 pages total).

Written Opinion mailed Oct. 24, 2022 issued in connection with corresponding international application No. PCT/EP2022/068358 with English translation (9 pages total).

Chinese Office Action mailed Apr. 12, 2024 issued in connection with with corresponding Chinese Patent Application No. 202280044856.1 with English language translation (18 pages total).

* cited by examiner

DC VOLTAGE SWITCHING DEVICE HAVING EARTH FAULT PROTECTION

CROSS REFERENCE

This application claims the benefit under 35 U.S.C. § 371 of International Application No. PCT/EP2022/068358, filed on Jul. 3, 2022, which in turn claims the benefit of Belgian Application No. BE2021/5522, filed on Jul. 5, 2021, the entire contents of which are hereby incorporated by reference in their entirety.

FIELD

Embodiments of the present invention relate to a DC voltage switching device having earth fault protection, in particular a DC voltage switching device for coupling a DC voltage load to a DC voltage source via a positive conductor and negative conductor.

BACKGROUND

It is generally known from the state of the art to use DC voltage switching devices for the electrical coupling of DC voltage loads to DC voltage sources. In this case, both a positive conductor and a negative conductor, via which the DC voltage load is coupled to the DC voltage source, can be routed through the DC voltage switching device. In the context of the invention, the DC voltage load does not have to be a single load, but can also be composed of a group of DC voltage loads or be designed as a DC current network with a large number of DC voltage loads operated via it. Such DC voltage switching devices for electrically coupling DC voltage loads to DC voltage sources are becoming increasingly important, especially at factory level and/or in the implementation of intelligent networks, as a higher-level energy management system for the economic and energy optimization of the electrically coupled DC network can be easily integrated and predefined current-voltage characteristics in the DC voltage devices contained as a result can ensure the immediate balancing of power demand and power supply. In addition, many components that are required with alternating current can be omitted with DC. The advantages of a DC supply for industrial systems are therefore obvious. In the context of the embodiments of the present invention, a DC voltage load that can be electrically coupled to a DC voltage source can therefore in particular also form a logical unit and/or have components with strong functional dependencies on each other and/or contain intermediate circuit capacitances in order to keep switching-frequency equalization processes between individual devices away from the DC voltage source or the DC supply, and/or be electrically coupled to the DC voltage source or the DC supply via a DC voltage switching device.

Particularly in the case of network types in which the earth potential is not isolated from the active conductors (e.g., TN network), the fault location must be isolated from the rest of the network in the event of an earth fault. With sufficient low impedance, an earth fault can lead to an earth fault current, for example, which causes an upstream fuse to respond.

It is an object of the present invention to create a new and simple way of monitoring an earth fault when electrically coupling a direct voltage load to a DC voltage source, which requires only a small number of components.

The solution according to the embodiments of the present invention are provided by a DC voltage switching device and a switching system with the features according to the appended claims 1 and 9.

SUMMARY

Accordingly, a DC voltage switching device for coupling a DC voltage load via a positive conductor and negative conductor to a DC voltage source is proposed, wherein the positive conductor and the negative conductor are routed through the DC voltage switching device, wherein the DC voltage switching device has a first switching element for coupling and uncoupling the DC voltage load, which is a semiconductor-based, electronically controllable switching element integrated in the positive conductor or in the negative conductor, as well as a fuse integrated in the respective other conductor and a sensor at least for detecting the current flow of the conductor in which the first switching element is integrated. Furthermore, the DC voltage switching device has an evaluation device connected to the sensor and the first switching element, which is set up to compare the detected current flow with a threshold value and to control the first switching element to disconnect the DC voltage load when the threshold value is passed.

A significant advantage of the embodiments of the present invention is therefore that even in the event of an earth fault, the fault location can be disconnected from the rest of the network very quickly, in particular within a few μs, so that the current to be switched off does not become too high. The semiconductor-switching element can therefore switch off the conductor in which it is integrated in a few us and thus disconnect the DC voltage source from the fault location before the current becomes too high. Fuses with sufficient short-circuit strength are available so that the conductor in which they are integrated can also be disconnected sufficiently quickly. Therefore, if both the positive pole and the negative pole have a voltage with respect to earth potential that would result in a very large fault current in the event of an earth fault, the DC voltage switching device according to the invention has a means of safely disconnecting both in the positive branch and in the negative branch even in the event of such a fault. Since a controllable semiconductor switching element is generally required in one branch (positive or negative) for operational switching anyway, this switching element can also be used for earth fault protection for this branch. This requires a sensor that detects at least the current flow of this conductor, whereby the evaluation device, e.g. a μC (microcontroller), evaluates the sensor signal and switches off the semiconductor switching element when the threshold value is passed. The switching element, the sensor and the evaluation device thus together in particular also form the earth fault protection for the corresponding conductor.

In the other branch, a fuse can be used for earth fault protection. On the one hand, no further semiconductor switching element is required for operational switching, which means that a current sensor is not absolutely necessary in the branch with the fuse and accordingly no evaluation and no control is required for this branch. Furthermore, the power dissipation of the fuse is significantly lower, which is why the complex cooling that is usually required for the semiconductor switching element can be dispensed with. Accordingly, the use of a fuse also results in cost advantages.

Such a DC voltage switching device can also be used in particular to implement a switching system in which the positive conductor and the negative conductor are connected to a rectified three-phase AC network or to a DC voltage bus as a DC voltage source at an input of the DC voltage switching device and a DC voltage branch with the DC voltage load can be connected and disconnected at an output of the DC voltage switching device via the positive conductor and the negative conductor.

In a first embodiment, the sensor according to the present invention expediently has a sensor element arranged in series with the first switching element for detecting the current flow. In a supplementary or alternative embodiment, a sensor is arranged and set up for detecting the current flow of both conductors, in particular for detecting a current flow forming the differential current or sum current of the positive and negative conductors. When detecting a current flow forming the differential current or sum current. In this embodiment, the sensor element arranged in series with the first switching element can therefore also be omitted and/or a sensor element connected in series with the fuse can also be present and/or the detection of a differential current or sum current as a current flow can also be carried out, for example, by means of a sensor element that is set up to detect a magnetic field that forms around the positive conductor and negative conductor as a whole, such as described, for example, in application No. BE2021/5520 filed by the applicant with the Belgian registration authority on Jul. 5, 2021, entitled "Residual current monitoring for a DC voltage switching device" and to which reference is thus made with regard to the disclosure in this regard.

The term "difference", as used in the context of the present description and the claims, is to be understood as the difference in amount.

BRIEF DESCRIPTION OF THE DRAWINGS

The embodiments of the present invention are described in more detail below with reference to the accompanying drawings with reference to preferred embodiments, from which further features and advantages of the present invention are shown. The figures are schematic representations wherein.

The embodiments of the present invention are described in more detail below with reference to the accompanying drawings based on preferred exemplary embodiments.

DETAILED DESCRIPTION

Figure 1:
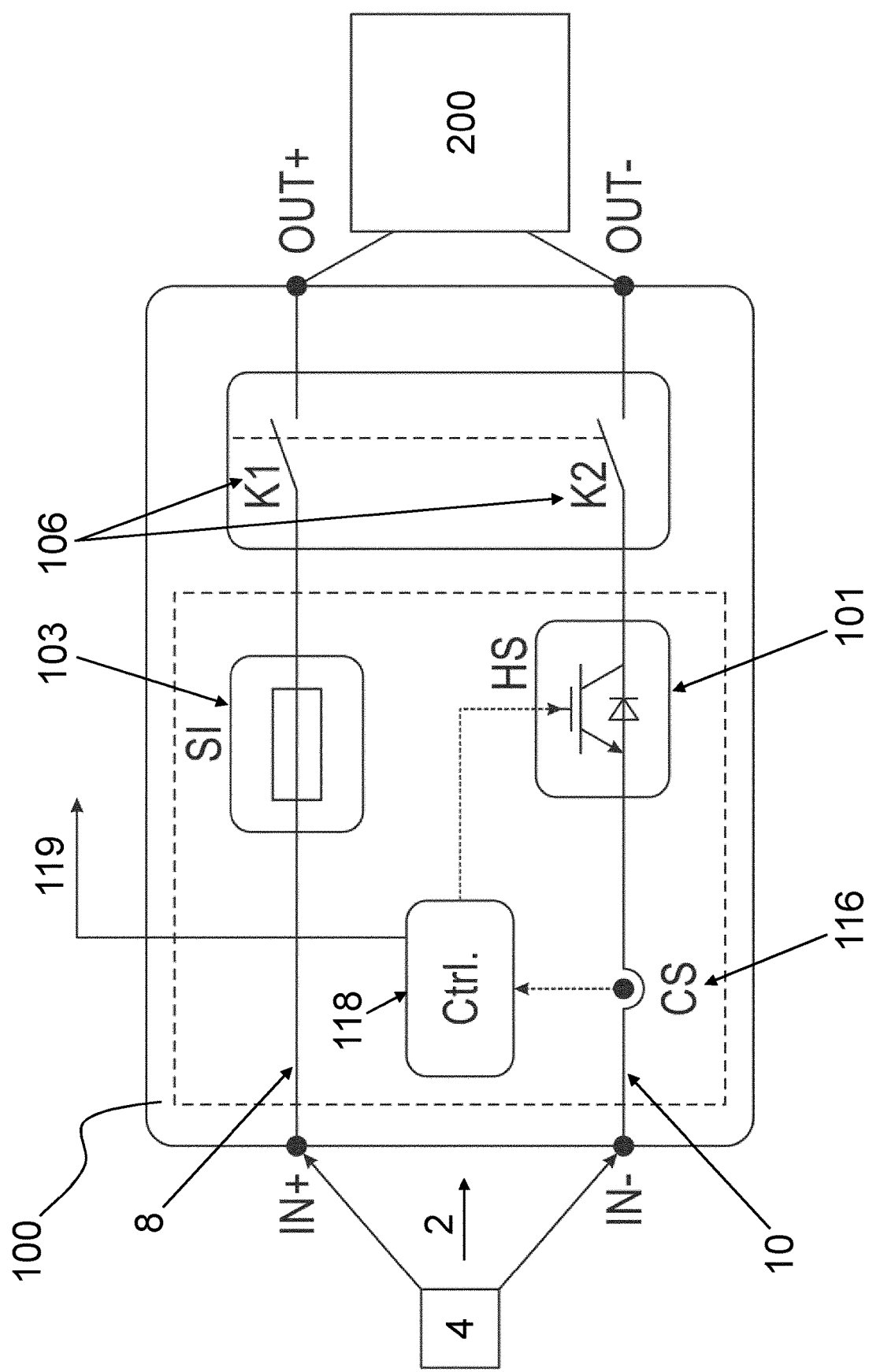
FIG. 1 shows a highly simplified first preferred embodiment of a DC voltage switching device according to the present invention.
Figure 2:
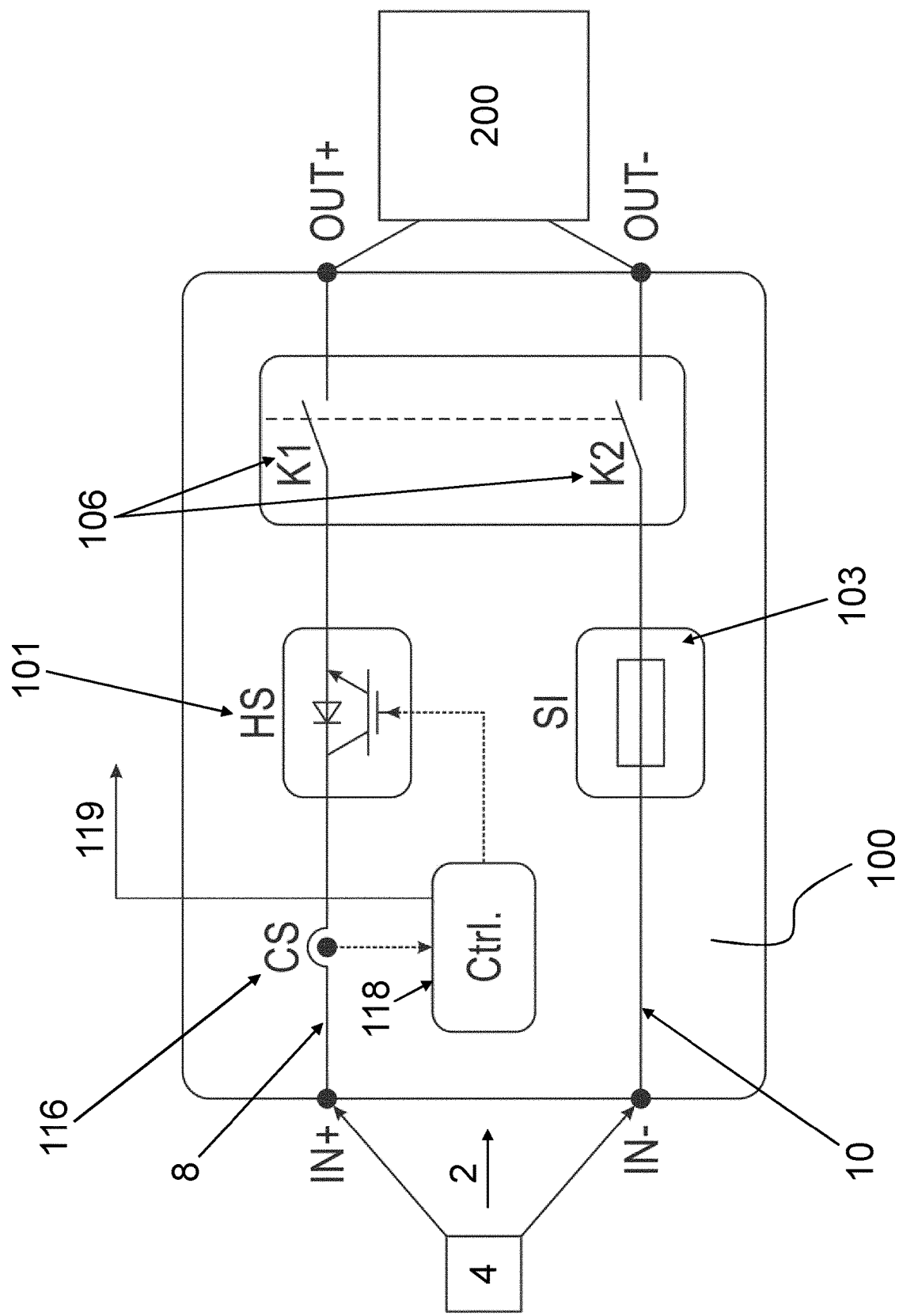
FIG. 2 shows a highly simplified second preferred embodiment of a DC voltage switching device according to the present invention.

In FIGS. 1 and 2, a first and a second preferred embodiment of a DC voltage switching device according to the present invention are shown in highly simplified form. In detail, in FIGS. 1 and 2, a DC voltage switching device 100 is shown which is set up for coupling a DC voltage load 200 to a DC voltage source 4 via a positive conductor 8 and negative conductor 10. The positive conductor 8 and the negative conductor 10 are each routed through the DC voltage switching device 100. By means of the DC voltage switching device 100, a DC voltage branch 2 is set up, so as to speak, between the DC voltage source 4 and the DC voltage load 200. The positive and negative conductors 8, 10 can also be arranged on a printed circuit board, i.e. in particular in the form of conductor tracks. The DC voltage switching device 100 comprises, i.e. includes, a first switching element 101 for coupling and uncoupling the DC voltage load 200, which is a semiconductor-based, electronically controllable switching element integrated in the positive conductor 8 or in the negative conductor 10; and a fuse 103 integrated in the respective other conductor. In FIG. 1, the semiconductor-based, electronically controllable switching element additionally marked with "HS" is integrated in the positive conductor 8 and in FIG. 2 in the negative conductor 10. Correspondingly, an additional fuse 103 marked with "SI" is integrated in the negative conductor 10 in FIG. 1 and in the positive conductor in FIG. 2.

Furthermore, the DC voltage switching device 100 comprises a sensor 116, which is arranged at least for detecting the current flow of the conductor in which the first switching element 101 is integrated. In FIGS. 1 and 2, the sensor 116, according to an expedient embodiment, has a sensor element arranged in series with the first switching element 101 for detecting the current flow, i.e. the current flow of the conductor in which the first switching element 101 is also integrated. The sensor element detecting this current flow is additionally marked with "CS".

An evaluation device 118 of the DC voltage switching device 100, which is connected to the sensor 116 and the first switching element 101 and additionally marked with "Ctrl" in FIGS. 1 and 2 is finally set up to compare the detected current flow with respect to a threshold value and to control the first switching element 101 accordingly to disconnect the DC voltage load 200 when the threshold value is passed. The semiconductor-based switching element 101 is consequently switched off and the DC voltage load 200 is subsequently at least electrically decoupled and can no longer be operated via the DC voltage source 4. At least the first switching element 101, the fuse 103 and the evaluation device 118 can be contained in a common housing unit of the DC voltage switching device 100, as indicated in FIG. 1 by the dashed outline, and in particular the fuse 103 can also be contained in the DC voltage switching device 100 in a supplementary or alternatively replaceable manner. This means that it can be easily replaced in the event of "destruction".

Consequently, the DC voltage switching device 100 according to the present invention ensures the isolation of the fault location from the rest of the network in the event of an earth fault, particularly in network forms in which the earth potential PE is not isolated from the active conductors, and it offers the possibility of safely isolating the fault in both the positive branch 8 and the negative branch 10.

The controllable semiconductor switching element in one of the conductors, i.e. in the positive or negative conductor, which is generally required for operational switching anyway, can switch off in a few µs and thus disconnect the DC voltage source 4 from the fault location before the current becomes too high. This semiconductor switching element is therefore also used as the first switching element for the earth fault protection for this conductor, so that the disconnection can take place very quickly, i.e. in particular within a few µs, and the current to be switched off is not too high. The current flow detected in relation to this conductor is evaluated by the evaluation device 118, which may include a µC (microcontroller) or comparator circuit, for example, and controls the first switching element 101, i.e. the semiconductor element, to disconnect the DC voltage load accordingly when a threshold value is passed, i.e. switches it off. Together, the first switching element 101, the sensor 116 and the evaluation device 118 form the earth fault protection for the corresponding conductor.

In the other conductor, however, fuse 103 is used for earth fault protection. Fuses with sufficient short-circuit strength are available, which may therefore react more slowly, but can safely switch off very high currents (e.g. several 10 kA). The advantage is that no further semiconductor switching element is required and consequently a sensor for detecting the current flow of the conductor in which the fuse is integrated is not mandatory. A corresponding evaluation and control is also not absolutely necessary for this conductor. Furthermore, the power loss of the fuse is significantly lower, which is why there is no need for complex cooling, as is usually required for a semiconductor switching element. No additional controllable semiconductor switching element is required in the second conductor for operational switching anyway. Accordingly, the use of a fuse also results in cost advantages.

However, in a modification to the embodiments shown in FIGS. 1 and 2, the sensor element 116 arranged in series with the first switching element 101 could also be omitted, and the current flow of the conductor in which the first switching element 101 is integrated could be detected by means of a sensor system arranged and set up accordingly in another way.

An expedient possibility according to the embodiments of the present invention, in addition to or as an alternative to a sensor element arranged in series with the first switching element 101, to detect the current flow of the conductor in which the first switching element 101 is also integrated, is to detect the current flow of both conductors by means of a sensor arranged and set up accordingly, i.e. in particular to detect a current flow forming the differential current or sum current of the positive and negative conductors. As defined at the beginning, the term "difference", as used in the context of the present description and the claims, is to be understood as the difference in amount. If there is no fault current, i.e. in particular no current flow to earth potential in the DC voltage branch, then the amounts of the currents in the positive conductor and negative conductor are equal in the optimum case, i.e. the sum of the currents is zero or the difference in amount is zero. Consequently, in the event of an earth fault, a current flow of the conductor in which the first switching element 101 is integrated can also be detected in any case by means of such a sensor.

According to the preferred design, the detection of such a current flow can be carried out by detecting a magnetic field that forms in total around the positive conductor 8 and negative conductor 10. In particular, a sensor equipped with a Hall effect sensor element can be used for this purpose. For an easy-to-implement detection of the overall magnetic field that forms in total around these conductors, the positive conductor 8 and the negative conductor 10 can, for example, also be guided through a common through-opening of a ferrite core contained in the DC voltage switching device, which is preferably separated at one point and accommodates the sensor in the air gap that is consequently formed there. With the help of such a ferrite core, the magnetic field lines can be appropriately bundled and guided. For reasons of clarity, this practical possibility is not shown in more detail in the figures, but reference is made to the disclosure of application No. BE2021/5520 filed by the applicant with the Belgian registration authority on Jul. 5, 2021 with the title "Residual current monitoring for a DC voltage switching device".

Figure 3:
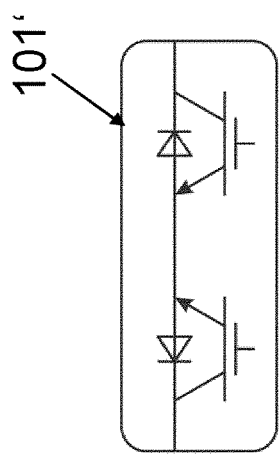
FIG. 3 shows a highly simplified version of another preferred embodiment of a first switching element, which is made up of two electronically controllable switching units connected in an anti-serial manner.

As shown in greatly simplified form in FIG. 3, as a modification to FIGS. 1 and 2 a first switching element 101' can also be used, which comprises two anti-serially switched electronically controllable switching units. In the case of such an anti-serial structure, i.e. in particular as a bidirectional switch, operation of the DC voltage load, i.e. the current flow required for this with corresponding connection to the DC voltage source, is also possible in a bidirectional manner and respective one of the anti-serially switched diodes of the semiconductor element can ensure the limitation of a respective current flow in one direction or the other.

The evaluation device 118 can have an analog circuit, a discrete circuit or preferably also a µC (microcontroller) for evaluating the detected current flow, i.e. in particular for comparing the detected magnetic field with respect to a threshold value and for activating the at least one switching element 101. If the current flow exceeds or falls below a threshold value, in particular a predetermined threshold value, depending on the design and/or area of application, the switching element, i.e. for example the switching element 101 shown in FIG. 1 for decoupling the load 200 from the source 4, is activated accordingly, i.e. in particular switched off. However, the switching element for coupling and decoupling the DC voltage load 200 can also comprise a second and a third switching element 106, in particular a second and a third electromechanical switching element, wherein one of the second and third switching elements 106 is integrated in the positive conductor 8 and the other in the negative conductor 10. In this way, galvanic decoupling of the load 200 from the source 4 can also be achieved, in particular equally by means of the evaluation device 118. For this purpose, the second and third switching elements 106 can therefore have relay contacts, in the case of FIGS. 1 and 2 additionally marked with K1 and K2 respectively. However, such relay contacts are unsuitable for rapid disconnection, as the time to disconnection is in the ms range.

Consequently, if the current flow detected and evaluated by the evaluation device 118 is passing a predetermined critical value, the first switching element 101 or, in addition, the second and third switching elements 106 can be switched off by the evaluation device 118, depending on the value passed and the special design, and thus the DC voltage branch can be electrically or galvanically decoupled from the DC voltage source 4. Furthermore, the current flow in both directions is prevented by switching off the second and third switching elements 106, whereas when only the first switching element 101 is switched off, the current flow is only prevented in one current flow direction. The second and third switching elements 106 therefore always provide safe galvanic isolation of the DC output from the DC input. The evaluation device 118 is also preferably set up to take into account, at least for switching off the first switching element 101, when a current flow rate of change, current amplitude and/or current direction predetermined by the threshold value is passed. In other words, as an alternative or in addition to the current amplitude in particular, the current flow rate of change and/or the current direction can also be compared with a threshold value and lead to the first switching element (101) being switched off when this is passed. In particular, in addition to a comparison of the current amplitude, a comparison of the current flow rate of change and/or the current direction also takes place during an evaluation with respect to a threshold value and leads to switching off if the threshold value is passed.

The evaluation device 118 also has a signal output or a communication interface in an expedient further development, namely for outputting 119 a message signal if the threshold value is passed and/or if the threshold value is not passed but the detected current flow has a greater value in terms of amount than a second threshold value that is smaller in terms of amount than the threshold value. In this way, tolerable current changes, fluctuations and/or losses during operation of the DC voltage load can also be taken into account in a versatile and flexible manner via the comparison with a threshold value.

Furthermore, the evaluation device 118 is expediently designed and set up not only to decouple the DC voltage load 200 or the entire DC voltage branch 2 electrically or additionally also galvanically from the DC voltage source 4 by means of corresponding activation commands to the switching element or the switching elements, i.e. to switch it off, but also to effect the electrical and/or galvanic coupling of the DC voltage load 200 or the entire DC voltage branch 2 to the DC voltage source 4 by means of corresponding activation commands to the switching element or the switching elements, i.e. to switch it on. In particular, a command to the evaluation device 118 for effecting the switch-on based on this can, according to an appropriate embodiment, also be received by the evaluation device 118, for example via a communication interface as described above or via another input interface, in particular a digital input.

With a DC voltage switching device as described above in various embodiments, a switching system can therefore also be implemented in particular, in which the positive conductor 8 and the negative conductor 10 are connected to the DC voltage source 4 at an input IN+, IN− of the DC voltage switching device 100 and a DC voltage branch can be connected to and disconnected from the DC voltage load 200 at an output OUT+, OUT− of the DC voltage switching device 100 via the positive conductor 8 and the negative conductor 10 (see FIG. 1).

Figure 5:
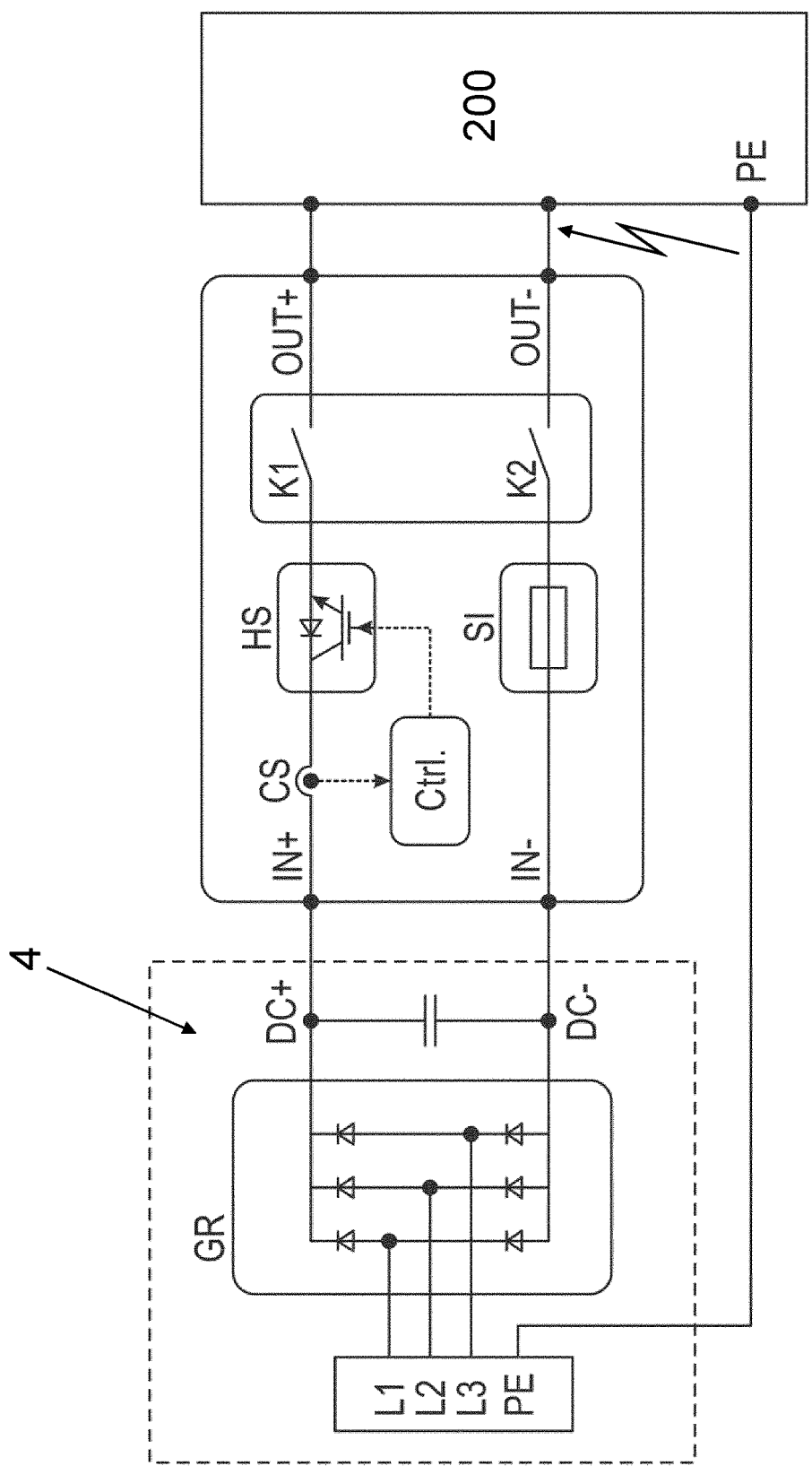
FIG. 5 shows a highly simplified circuit diagram of a switching system according to the present invention with a DC voltage switching device and a rectified three-phase AC network as a DC voltage source on the input side and a connected DC voltage load on the output side as well as with an indicated earth fault from PE to the negative line at the device output.

As a rule, the DC voltage of the DC voltage source 4 is usually generated from a three-phase AC network with L1, L2, L3 by means of a rectifier GR, whereby the rectification can be carried out actively with a power electronic circuit or passively with diodes. FIG. 5 shows a highly simplified circuit diagram of a switching system according to the invention with a DC voltage switching device and rectified three-phase AC network as DC voltage source 4 on the input side IN+, IN− and connected DC voltage load 200 on the output side OUT+, OUT− as well as with an indicated earth fault from PE to the negative line at the device output.

Figure 4:
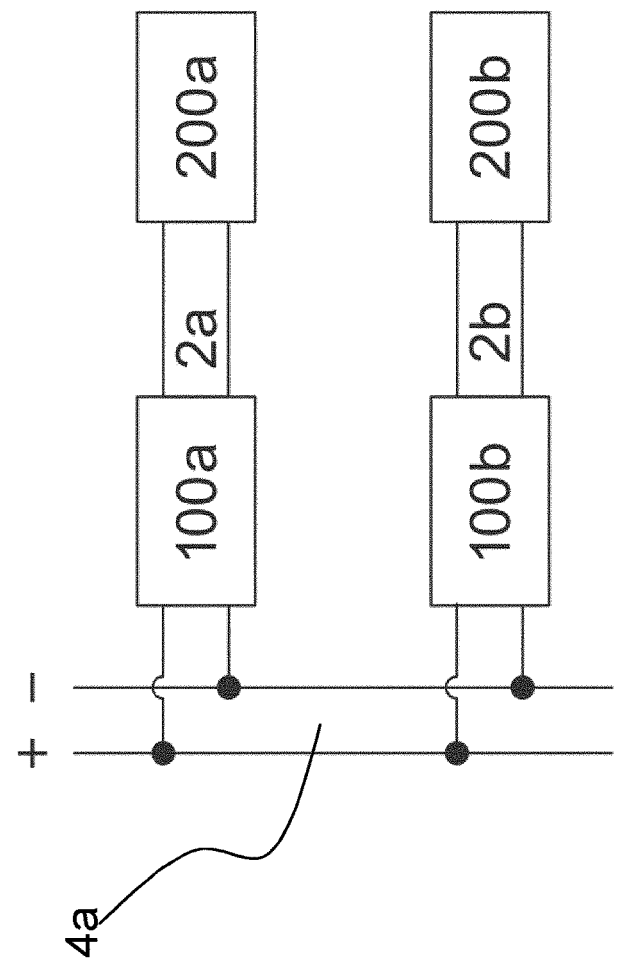
FIG. 4 shows a highly simplified DC bus with positive and negative conductors as a DC voltage source with two DC branches, which can be coupled to the DC bus by means of DC voltage switching devices according to the present invention.

Based on this, FIG. 4 shows a highly simplified sketch of a preferred switching system, which has a first such DC voltage switching device 100a with an input and an output, whereby the positive conductor and the negative conductor 10 input are connected to a DC voltage bus 4a as a DC voltage source and a DC voltage branch 2a with a DC voltage load 200a can be connected and disconnected at the output via the positive conductor and the negative conductor.

In an expedient further development according to FIG. 2, at least one further such DC voltage switching device 100b with an input and an output is also included, whereby in this further DC voltage switching device 100b the positive conductor 8 and the negative conductor 10 are also connected to the DC voltage bus 4a at the input and a further DC voltage branch 2b with a DC voltage load 200b can be connected and disconnected at the output via the positive conductor 8 and the negative conductor 10.

In view of the above description, the DC voltage load does not have to be a single load, but can be made up of a group of DC voltage loads or be designed as a DC network with a large number of DC voltage loads operated via it.

In practical implementation, a MOSFET ("metal-oxide-semiconductor field-effect transistor") or IGBT ("insulated gate bipolar transistor"), for example, is suitable for rapid decoupling of the DC voltage load or the DC voltage branch from the DC voltage source, in particular a DC voltage bus, for the semiconductor-based, electronically controllable switching element 101. By means of the evaluation device 118 described above, it is therefore possible, depending on the application and/or the specific design, in particular to realize a charging current limitation of connected DC voltage loads, i.e. a precharging of DC link capacitors of the connected loads to the input voltage level, monitoring of various status variables, such as the input voltage, the output voltage, the load current and leakage currents to PE (residual current), a switch-off in the event of an error, i.e. as soon as a state variable leaves the permissible range, a residual current switch-off, i.e. a switch-off if the difference between the currents in the positive and negative conductors becomes too great, and/or rapid shutdown in the event of a short circuit on the output side.

The invention claimed is:

1. A DC voltage switching device for coupling a DC voltage load via a positive conductor and negative conductor to a DC voltage source, the positive conductor and the negative conductor being routed through the DC voltage switching device, comprising:
    a first switch for coupling and decoupling the DC voltage load, wherein the first switch is a semiconductor-based, electronically controllable switch integrated in the positive conductor or in the negative conductor;
    a fuse integrated in the respective other conductor;
    a sensor, at least for detecting a current flow of the conductor in which the first switch is integrated; and
    an evaluation device connected to the sensor and the first switch, which together with the first switch and the sensor forms an earth fault protection for the conductor in which the first switch is integrated and is set up for this purpose to compare the detected current flow with respect to a threshold value and to trigger the first switch in order to disconnect the DC voltage load when the threshold value is passed.

2. The DC voltage switching device of claim 1, wherein the sensor has a sensor element arranged in series with the first switch for detecting the current flow.

3. The DC voltage switching device of claim 2, comprising second and third switches for coupling and decoupling the DC voltage load, wherein the second and third switches are electromechanical switches, and wherein one of the second and third switches is integrated in the positive conductor and the other is integrated in the negative conductor.

4. The DC voltage switching device of claim 1, wherein the sensor is arranged and set up for detecting the current flow of both conductors, forming a differential current or sum current of the positive and negative conductors.

5. The DC voltage switching device of claim 2, wherein the first switch comprises two anti-serially switched, electronically controllable switching units.

6. The DC voltage switching device of claim 2, wherein at least the first switch, the fuse and the evaluation device are contained in a common housing unit.

7. A switching system with the DC voltage switching device of claim 2, wherein the DC voltage switching device has an input and an output, wherein the positive conductor and the negative conductor are connected at the input to a DC voltage bus as a DC voltage source and a DC voltage branch with at least one DC voltage load can be connected and disconnected at the output via the positive conductor and the negative conductor.

8. The DC voltage switching device of claim 4, comprising second and third switches for coupling and decoupling the DC voltage load, wherein the second and third switches are electromechanical switches, and wherein one of the second and third switches is integrated in the positive conductor and the other is integrated in the negative conductor.

9. A switching system comprising the DC voltage switching device of claim 1, wherein the DC voltage switching device has an input and an output, wherein the positive conductor and the negative conductor are connected at the input to a DC voltage bus as a DC voltage source and a DC voltage branch with at least one DC voltage load can be connected and disconnected at the output via the positive conductor and the negative conductor.

10. The DC voltage switching device of claim 1, comprising a second and third switches for coupling and decoupling the DC voltage load, wherein the second and third switches are electromechanical switches, and wherein one of the second and third switch is integrated in the positive conductor and the other is integrated in the negative conductor.

11. The DC voltage switching device of claim 1, wherein the first switch comprises two anti-serially switched, electronically controllable switching units.

12. The DC voltage switching device of claim 1, wherein at least the first switch, the fuse and the evaluation device are contained in a common housing unit.

13. The DC voltage switching device of claim 1, wherein the positive conductor and the negative conductor are designed as conductor tracks on a circuit board.

14. The DC voltage switching device of claim 1, wherein the evaluation device is set up to compare not only a current amplitude but also a current flow rate of change and/or current direction with the threshold value and to cause the first switch to be switched off if this is exceeded.

15. The DC voltage switching device of claim 2, wherein the sensor is arranged and set up for detecting the current flow of both conductors, forming a differential current or sum current of positive and negative conductors.

* * * * *